Nov. 28, 1961      H. J. DONALD      3,010,935
GRANULES OF ALKENYLAROMATIC HYDROCARBON POLYMER-RUBBER
COMPOSITIONS WITH IMPROVED
EXTRUSION CHARACTERISTICS
Filed Oct. 23, 1957
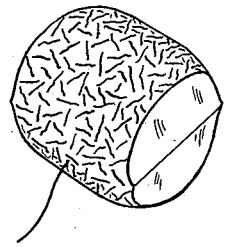
Extrusion granule, preferably 2-20%
rubbery diene polymer, balance poly-
styrene, having a density from 0.90
to 1.10, a crazed surface, and a surface
area of at least 0.20 sq. meter per gram.
INVENTOR.
Harold Jack Donald
BY
Griswold & Burdick
ATTORNEYS 3,010,935
GRANULES OF ALKENYLAROMATIC HYDRO-
CARBON POLYMER-RUBBER COMPOSITIONS
WITH IMPROVED EXTRUSION CHARACTERIS-
TICS
Harold Jack Donald, Midland, Mich., assignor to The
Dow Chemical Company, Midland, Mich., a corpora-
tion of Delaware
Filed Oct. 23, 1957, Ser. No. 691,913
4 Claims. (Cl. 260—45.5)

This invention is concerned with improving the extrusion characteristics of compositions of alkenylaromatic hydrocarbon polymers, such as polystyrene, and natural or synthetic rubber.

There have come into widespread use a number of compositions consisting essential of a preponderant proportion of an alkenylaromatic hydrocarbon polymer and a small proportion, from 2 to 20 or more percent and commonly from 4 to 8 percent, of natural or synthetic rubber. Such compositions are prepared advantageously by dissolving or suspending natural or synthetic rubber in an alkenylaromatic hydrocarbon monomer and polymerizing the latter. They may also be prepared by milling the components together. The alkenylaromatic hydrocarbon most commonly employed is styrene, though the vinyltoluenes may also be used alone or with styrene, and minor amounts of alpha-methylstyrene may be and often are employed. The rubber which is used may be natural unvulcanized rubber or it may be a rubbery copolymer of butadiene or isoprene or both with styrene or acrylonitrile. The compositions of the described type are used widely in the plastics industry and products made from them find special favor because of their high impact strength as compared with that of polystyrene.

One common use for the compositions here-concerned is in the production of extruded sheet stock from which shaped articles may be made by the well known process of vacuum molding. For this and other extrusion purposes it is conventional for the plastics manufacturer to convert the compositions to the form of dense pellets or granules suitable in size and shape as feed to a worm-fed plastics extruder. Depending on the requirements of the apparatus which is to use the granules, these are generally of approximately uniform size in each batch, and the size required is usually in the range from 0.03 inch to 0.25 inch average diameter, though other sizes are made on request. All of these conventional, dense granules, regardless of their cubic dimensions, have surface areas of less than 0.10 and usually less than 0.05 square meter per gram.

The common way of making such molding granules, so far as it is known to the applicant, is to extrude the polymer-rubber composition either in the form of multiple strips or filamentary streams of the desired diameter, or as a thin sheet or strip which while still hot and flowable is deposited on a linearly grooved support with grooves of the desired width and spacing, and then, when the filaments or grooved sheets have solidified, cutting them into pellets or granules of nearly the same length as their width or diameter.

When using such granules as feed to a plastics extruder, as when making sheets, rods, filaments or other extruded shapes from them, it has been common experience that there is a limiting rate of extrusion below which sound, bubble-free extruded products are made but above which the extruded products are defective because of the presence therein of voids or bubbles of various sizes. Such defects, obviously, are to be avoided. It is equally apparent that it is uneconomical to operate an extruder so that its actual output is much below its productive capacity. Any increase in output which still meets the commercial requirements for a sound, void-free product is much to be desired.

Accordingly, it is the principal object of this invention to provide granules of the described composition which give void-free extruded products at a higher rate of output than is possible with the granules heretofore available. A related object is to provide a method for making extrusion granules having such improved qualities. A further object is to provide a method whereby void-free extrudates of the described composition may be made at greater than conventional rates. Other and related objects may appear hereinafter.

The present invention, whereby the foregoing and related objects are attained, is based on the discovery that if, in the course of their production and after they have been cooled below their second order transition temperature, but prior to their use in making extruded articles, there is applied to the granule or to the sheet or strand from which it is to be cut a stress such as to cause the surface to craze, the resulting granules can be made in the usual sizes but with surface areas of 0.20 to 0.60 or more square meter per gram, and that the pellets so-characterized can be extruded to form void-free products at rates which exceed by 7 to 15 percent the highest rates attainable when making void-free products from the conventional pellets with the described smaller surface areas.

The single figure of the annexed drawing illustrates one of the new granules of the invention.

The manner in which the surface crazing of the pellets is accomplished is not critical, so long as it results in an increase in surface area to a value of at least 0.20 square meter per gram. Two convenient and operative procedures will be described, both of which accomplish the desired result by the application of a distorting force. For purpose of the illustrative examples, the composition used to make the pellets was produced by dissolving a synthetic rubber copolymer (60 percent butadiene–40 percent styrene) in monomeric styrene and polymerizing the latter. The amount of synthetic rubber present in the final composition was near 5 percent. The product was a typical "high impact polystyrene."

The modified polystyrene, just described, was extruded through a die having a horizontally disposed row of orifice each near 0.125 inch in diameter. Four batches of pellets were made from the same feed supply in the following manners:

(A) The filamentary product was extruded into a bath of water which was at room temperature. The strands were withdrawn continuously through a single pair of resilient rubber-covered takeaway rolls, after which the strands were cut to form granules or pellets of about the same length as diameter.

(B) The extrudate was cut into pellets of the same length as diameter; while still hot, by means of a reciprocating cutter blade.

(C) The extrudate was passed into a water bath, as in (A), to cool it below its second order transition temperature and was withdrawn through and around a series of four horizontally disposed, closely spaced, parallel small rollers, each about 1.25 inches in diameter, thereby being required to traverse a sinuous course which imposed a superficial stress consecutively on opposite sides of the strands. The strands were then cut into granules as described in (A).

(D) The extrudate was passed into water and formed into granules, as in (A). The granules were then fed to the nip of a pair of highly polished steel pressure rolls, with sufficient pressure applied to deform the granules of initially circular cross-section to a somewhat flattened shape in which the longer, transverse dimension (width) is from 1.5 to 2 times as great as the shorter dimension (thickness). The granules obtained in methods (C) and (D) had crazed surfaces, while those of methods (A) and (B) did not.

A measurement was made of the surface area of each of the four batches of granules. Those produced by procedures (A) and (B) are conventional, both as to the manner of production and as to surface area.

Each batch of granules was thereafter used in succession as feed to the same extruder. In each case the extrusion rate was increased gradually until the extrudate showed evidence of bubbles or voids, and was then decreased until such voids no longer appeared in the product. The rate of extrusion at this point was determined in each case in terms of pounds of composition extruded per hour to form void-free extrudate. The results are tabulated as follows.

| Pellets | Area, m.²/g. | Max. extrusion Rate, pounds/hr. |
|---|---|---|
| A | 0.05 | 180 |
| B | 0.04 | 179 |
| C | 0.20 | 196 |
| D | 0.54 | 200 |

In another similar series, in which the granules were about 0.06 inch in average diameter, the following results were obtained.

| Pellets | Area, m.²/g. | Max. extrusion Rate, pounds/hr. |
|---|---|---|
| A | 0.02 | 180 |
| B | 0.03 | 178 |
| C | 0.33 | 222 |

A comparison was made of granules, all of the same size, produced by the described methods, of three compositions based on the same high impact polystyrene but differing from one another in the amount and kind of volatile, non-polymeric constituent added to the granules. As before, a determination was made of the maximum rate at which each batch of granules could be extruded through the same extruder and still produce sound, void-free extrudate.

| Method | Added Volatile Matter | | Area, m.²/g. | Max. Extrusion Rate, pounds/hr. |
|---|---|---|---|---|
| | Percent | Kind | | |
| B | 0 | None | 0.01 | 175 |
| C | 0.5 | Ethylbenzene | 0.47 | 209 |
| C | 0.5 | Isopropylbenzene | 0.46 | 206 |
| D | 0 | None | 0.54 | 200 |

The utility of the present invention has been demonstrated not only with high impact monoalkenylaromatic hydrocarbon polymers containing about 5 percent of a butadiene-styrene synthetic rubber, but also with such compositions containing from 2 to 20 percent of either natural or synthetic rubbery diene polymer. It has been verified as well with granules of the various sizes, from 0.03 to 0.25 inch average diameter, commonly used in commercial extrusion operations. Whenever the granules had sufficiently crazed surfaces to have a surface area of at least 0.20 square meter per gram, a significantly greater extrusion rate was possible with any of the available types of extruders, without producing an extrudate having bubbles or voids, than when granules of the same size and composition were used having surface areas in the conventional range below 0.10 square meter per gram.

It is to be understood that the here-concerned surface-crazed granules are of essentially the same density as the conventional extrusion granules (near 0.90–1.10) and are not to be confused with spongy or highly porous "foamed" granules which are generally unsatisfactory as feed to extruders and also are commonly characterized by surface areas of several square meters per gram and by densities under 0.6 gram and usually under 0.3 gram per cubic centimeter.

The measurement of surface area referred to herein was accomplished by the method described by Brunauer, Emmett and Teller, J.A.C.S. 60, 309 (1938). The method gives results which are reproducible within ±15 percent, so that a measurement purporting to show a surface area of 0.20 square meter per gram can be taken with assurance to represent a measurable area of from 0.17 to 0.23 square meter per gram.

I claim:

1. An extrusion granule of a composition consisting essentially of a minor proportion, from 2 to 20 percent by weight, of a polymeric material from the class consisting of natural, unvulcanized rubber and the synthetic rubbery styrene-butadiene, styrene-isoprene, acrylonitrile-butadiene and acrylonitrile-isoprene copolymers, and a predominant proportion, correspondingly from 98 to 80 percent by weight, of a monoalkenyl benzene series hydrocarbon polymer from the class consisting of polystyrene, the polyvinyltoluenes, and styrene-vinyltoluene copolymers, the said granule having a density at temperatures below its second order transition temperature of from 0.90 to 1.10 and a crazed surface with an area of at least 0.20 square meter per gram.

2. The granule claimed in claim 1, wherein the rubbery material is a butadiene-styrene copolymer and the predominant polymer constituent is polystyrene.

3. The granule claimed in claim 2, wherein the proportion of the rubbery copolymer is from 4 to 8 percent, by weight.

4. The granule claimed in claim 2, having a surface area of from 0.20 to 0.60 square meter per gram.

References Cited in the file of this patent

UNITED STATES PATENTS

| | | |
|---|---|---|
| 2,391,638 | Meakin | Dec. 25, 1945 |
| 2,606,163 | Morris et al. | Aug. 5, 1952 |
| 2,623,243 | Jean et al. | Dec. 20, 1952 |
| 2,681,898 | Daly | June 22, 1954 |
| 2,727,878 | Ballman et al. | Dec. 20, 1955 |
| 2,746,086 | Vickers | May 22, 1956 |